March 27, 1956 C. G. SMITH 2,739,464
CHOPPING AND MIXING BOWL
Filed Oct. 9, 1952

INVENTOR.
CHARLES G. SMITH.

United States Patent Office 2,739,464
Patented Mar. 27, 1956

2,739,464

CHOPPING AND MIXING BOWL

Charles G. Smith, Tacoma, Wash.

Application October 9, 1952, Serial No. 313,823

1 Claim. (Cl. 65—15)

The present invention relates to a chopping and mixing bowl and it consists in the combinations, constructions and arrangements of parts herein described and claimed.

Generally there is provided a chopping and mixing bowl having a laterally extending spout at one end thereof which spout essentially consists of a hooded portion at one end of the bowl, the hooded portion being integral with the bowl proper and having an opening in one side thereof whereby, after materials have been chopped or mixed within the bowl proper, the contents of the bowl may be quickly, easily and neatly removed to a jar or bottle. The device is particularly useful in canning where, after mixing material to be canned in the bowl proper, the same may be immediately transferred to the canning jars by tipping the device of the present invention so that the contents will immediately pass into the jar without any portion thereof dropping upon the surrounding table or workbench.

It is accordingly an object of the invention to provide a device of the character set forth which is simple in construction, inexpensive to manufacture and yet effective and efficient in use.

Another object of the invention is to provide a device of the character set forth which lends itself to manufacture from plastic material in attractive colors.

Another object of the invention is to provide a device of the character set forth which may be formulated of a single piece of material.

Other and further objects of the invention will become apparent from a reading of the following specification taken in conjunction with the drawing, in which.

Figure 1:
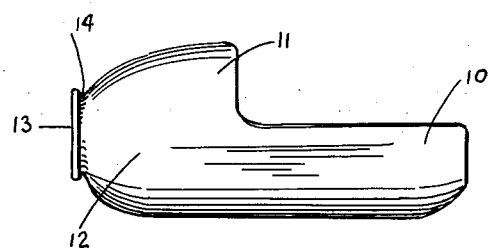
Figure 1 is a side elevational view of an embodiment of the invention.
Figure 2:
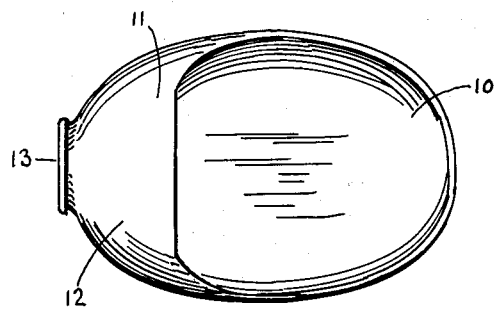
Figure 2 is a plan view of Figure 1.
Figure 3:
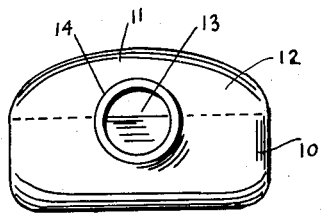
Figure 3 is an end elevational view of the device illustrated in Figures 1 and 2.

Referring more particularly to the drawing, there is shown therein a device of the character set forth comprising a bowl 10 which is shown as being oval in shape when viewed from above but which may take any other convenient shape. Integrally formed with the bowl 10 at one side portion thereof is an upwardly extending integrally formed hood 11 which, taken with the bowl 10 forms what essentially is a funnel 12 having an opening 13 in a narrowed outer extremity 14 thereof.

In operation, it will be apparent that materials such as vegetables, fruits and the like may be mixed or chopped within the vessel 10 in conventional manner and that thereafter the device may be tipped so that the narrowed end 14 may be inserted into a jar which is desired to fill with the material in the bowl 10. When this occurs, the funnel 12 will act to guide such material from the bowl 10 through the narrowed portion 14 and the opening 13 whereupon it will drop by gravity into the jar or other container without, however, allowing any of such material to drop accidentally in the surrounding territory such as the table or bench upon which the jar may be placed.

While but one form of the invention has been shown and described herein, it will be readily apparent to those skilled in the art that many minor modifications may be made without departing from the spirit of the invention or the scope of the appended claim.

What is claimed is:

A mixing dish for foods and the like comprising an horizontally elongated bowl having substantially rounded vertical sides, said bowl having one end covered by an integral rounded hooded portion at one end thereof, said hooded portion and bowl tapering to a narrowed outer portion having an opening therein communicating directly with the interior of the bowl, said bowl being substantially oval in shape.

References Cited in the file of this patent

UNITED STATES PATENTS

| | | |
|---|---|---|
| D. 122,782 | Muller | Oct. 1, 1940 |
| D. 129,479 | Haus | Sept. 16, 1941 |
| D. 167,166 | Rodier | July 1, 1952 |
| 50,906 | Codman | Nov. 14, 1865 |
| 93,734 | Morahan | Aug. 17, 1869 |
| 671,346 | Lochmann | Apr. 2, 1901 |
| 1,384,786 | Thompson | July 19, 1921 |
| 1,878,348 | Te Selle | Sept. 20, 1932 |
| 1,893,628 | Marsden | Jan. 10, 1933 |
| 1,989,574 | Van Roosendael | Jan. 29, 1935 |
| 2,076,140 | Faunce | Apr. 6, 1937 |
| 2,121,118 | Cooper | June 21, 1938 |
| 2,207,417 | Smith | July 9, 1940 |
| 2,395,084 | Wolf | Feb. 19, 1946 |
| 2,469,032 | Chaudron | May 3, 1949 |
| 2,583,335 | Jepson | Jan. 22, 1952 |
| 2,627,735 | Dexter | Feb. 10, 1953 |

FOREIGN PATENTS

| | | |
|---|---|---|
| 23,719 | France | July 26, 1921 |
| 611,020 | France | June 26, 1926 |